United States Patent
Derneryd (10) Patent No.: US 10,283,861 B2
(45) Date of Patent: May 7, 2019

(54) DEVICE AND A METHOD FOR ANTENNA ALIGNMENT

(71) Applicant: TELEFONAKTIEBOLAGET L M ERICSSON (publ), Stockholm (SE)

(72) Inventor: Anders Derneryd, Göteborg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 27 days.

(21) Appl. No.: 15/026,921

(22) PCT Filed: Oct. 3, 2013

(86) PCT No.: PCT/EP2013/070617
§ 371 (c)(1),
(2) Date: Apr. 1, 2016

(87) PCT Pub. No.: WO2015/048998
PCT Pub. Date: Apr. 9, 2015

(65) Prior Publication Data
US 2016/0218427 A1 Jul. 28, 2016

(51) Int. Cl.
*H01Q 3/24* (2006.01)
*G01S 3/38* (2006.01)
(Continued)

(52) U.S. Cl.
CPC .............. *H01Q 3/247* (2013.01); *G01S 3/38* (2013.01); *H01Q 3/2605* (2013.01);
(Continued)

(58) Field of Classification Search
None
See application file for complete search history.

(56) References Cited

U.S. PATENT DOCUMENTS 4,791,429 A * 12/1988 Hannan .................. H01Q 1/286
343/725
5,030,960 A   7/1991 Bartley
(Continued)

FOREIGN PATENT DOCUMENTS

EP    1659813 A1   5/2006
FR    2947388 A1   12/2010

OTHER PUBLICATIONS

International Search Report and Written Opinion dated Jun. 20, 2014, in International Application No. PCT/EP2013/070617, 10 pages.
(Continued)

*Primary Examiner* — Zhiyu Lu
(74) *Attorney, Agent, or Firm* — Rothwell, Figg, Ernst & Manbeck, P.C.

(57) ABSTRACT

The present invention relates to a node in a wireless communication network. The node comprises an antenna arrangement which in turn comprises an array antenna. The array antenna comprises a first set of antenna elements forming a first antenna aperture, and a second set of antenna elements forming a second antenna aperture. The antenna arrangement further comprises a switching arrangement that is adapted to switch between a first mode of operation and a second mode of operation. In the first mode of operation, the first antenna aperture is arranged to generate a first antenna beam. In the second mode of operation, the first antenna aperture and the second antenna aperture are combined and arranged to generate a second antenna beam, the first antenna beam having a wider antenna beamwidth than the second antenna beam. The present invention also relates to a corresponding method.

15 Claims, 6 Drawing Sheets

(51) Int. Cl.
  *H01Q 3/26* (2006.01)
  *H01Q 25/00* (2006.01)
  *H04B 7/0408* (2017.01)
  *H04B 7/06* (2006.01)

(52) U.S. Cl.
  CPC ......... *H01Q 25/002* (2013.01); *H04B 7/0408* (2013.01); *H04B 7/0608* (2013.01); *H04B 7/0617* (2013.01); *H04B 7/0691* (2013.01)

(56) References Cited

U.S. PATENT DOCUMENTS

| | | | |
|---|---|---|---|
| 5,162,804 A | 11/1992 | Uyeda | |
| 6,642,908 B2* | 11/2003 | Pleva | B60K 31/0008 343/700 MS |
| 6,995,730 B2* | 2/2006 | Pleva | G01S 7/032 343/853 |
| 2004/0157645 A1* | 8/2004 | Smith | H01Q 1/246 455/562.1 |
| 2008/0174473 A1* | 7/2008 | Smith | G01S 7/4008 342/32 |
| 2010/0302101 A1* | 12/2010 | Leiba | H01Q 1/1257 342/359 |

OTHER PUBLICATIONS

Chinese Office Action dated Apr. 4, 2018, issued in Chinese Patent Application No. 201380079906.0, 13 pages.
European Communication dated Oct. 1, 2018, issued in European Patent Application No. 13773231.9, 4 pages.
Second Chinese Office Action dated Dec. 5, 2018, issued in Chinese Patent Application No. 201380079906.0, 14 pages.

\* cited by examiner

DEVICE AND A METHOD FOR ANTENNA ALIGNMENT

CROSS REFERENCE TO RELATED APPLICATION(S)

This application is a 35 U.S.C. § 371 National Phase Entry Application from PCT/EP2013/070617, filed Oct. 3, 2013, designating the United States, the disclosure of which is incorporated herein in its entirety by reference.

TECHNICAL FIELD

The present invention relates to a node in a wireless communication network, where the node comprises an antenna arrangement. The antenna arrangement in turn comprises an array antenna which in turn comprises a first set of antenna elements forming a first antenna aperture, and a second set of antenna elements forming a second antenna aperture.

The present invention also relates to a method for alignment of a first node with a second node in a wireless communication network. For a first mode of operation, the method comprises the steps:

Enabling a first mode port to transmit and/or receive signals via a first antenna aperture, using a first antenna beam having a first main pointing direction; and performing a first alignment procedure.

BACKGROUND

It is desired to acquire a high degree of capacity in wireless communication networks. One technique to increase capacity in a wireless communication network is to deploy low power pico radio base stations within macro cell coverage areas forming a heterogeneous network. Pico base stations are smaller than regular macro base stations, and cover smaller areas, and are in many cases placed close to street level and a backhaul aggregation point is usually placed at macro base stations above rooftop level.

Traditional wireless backhaul technologies for establishing a connection between pico base stations and a backhaul aggregation point are line-of-sight radio links. However, when the backhaul aggregation points are placed above rooftop level while the pico base stations are below the roof, closer to the street level, line-of-sight (LOS) may be prevented such that a none line-of-sight (NLOS) scenario exists. NLOS propagation scenarios make use of diffraction, reflection, and penetration effects.

At a NLOS propagation scenario, one cannot align the radio link backhaul antenna beams at the macro base station and the radio link backhaul antenna beam at the pico base station towards each other by means of visual inspection and manual adjustment. Traditionally, backhaul connection has then been solved by using for example copper wires or optical fiber wires.

However, the traditional backhaul technologies discussed above do not always fit a heterogeneous backhaul scenario. Wireless NLOS backhaul radio links equipped with high gain antennas have then been proposed as an alternative.

High gain radio link antennas with narrow beams are usually used in LOS applications, having a very narrow beam-width of a few degrees. The alignment process is then very sensitive to pointing errors. Thus, it becomes very hard to align two narrow beam-width antennas towards a common diffraction, reflection or penetration point in an NLOS scenario when there is no visual connection between them.

Aligning antennas in LOS scenarios is described in prior art, for example in WO 2008/047342, US 2010/0302101 and U.S. Pat. No. 6,836,675.

US 2010/0302101 teaches a method of automatic alignment of a first directional beam antenna with a second directional beam antenna at a predetermined path attenuation.

U.S. Pat. No. 6,836,675 teaches a method of achieving best wireless link status of microwave communication system by aiming the antennas at the best direction.

However, none of these documents discloses how to simultaneously align two narrow beam radio link antennas in an NLOS scenario, and there is thus a need for such a method.

SUMMARY

It is an object of the present invention to provide a method for simultaneously aligning two narrow beam radio link antennas in an NLOS scenario.

Said object is obtained by means of a node in a wireless communication network, where the node comprises an antenna arrangement. The antenna arrangement in turn comprises an array antenna which in turn comprises a first set of antenna elements forming a first antenna aperture, and a second set of antenna elements forming a second antenna aperture. The antenna arrangement further comprises a switching arrangement that is adapted to switch between a first mode of operation and a second mode of operation. In the first mode of operation, the first antenna aperture is arranged to generate a first antenna beam having a first main pointing direction, and in the second mode of operation the first antenna aperture and the second antenna aperture are combined and arranged to generate a second antenna beam having a second main pointing direction. The first antenna beam has a wider antenna beamwidth than the second antenna beam in at least one respective plane that runs parallel to, and through, the respective main pointing direction.

Said object is also obtained by means of a method for alignment of a first node with a second node in a wireless communication network. For a first mode of operation, the method comprises the steps:

Enabling a first mode port to transmit and/or receive signals via a first antenna aperture, using a first antenna beam having a first main pointing direction; performing a first alignment procedure;

enabling a second mode port to transmit and/or receive signals via the first antenna aperture and a second antenna aperture in combination, using a second antenna beam having a second main pointing direction, and performing a second alignment procedure.

The first antenna beam has a wider antenna beamwidth than the second antenna beam in at least one respective plane that runs parallel to, and through, the respective main pointing direction.

According to an example, the first main pointing direction and the second main pointing direction coincide.

According to another example, the array antenna comprises a total set of antenna elements forming a total antenna aperture. The total set of antenna elements are formed by the first set of antenna elements and the second set of antenna elements.

Correspondingly, the total antenna aperture is formed by the first antenna aperture and the second antenna aperture.

According to another example, the node further comprises a power dividing device having a first divided port, a second divided port and a combined port. Power running from the combined port to the divided ports is divided between the divided ports, and power running from the divided ports to the combined port is combined from the divided ports. The first divided port is switchable to the first set of antenna elements via at least the switching arrangement. The second divided port is arranged to transmit and/or receive signals via the second set of antenna elements, and the combined port is connected to a second mode port that is arranged to transmit and/or receive signals via the second antenna beam.

According to another example, the switching arrangement comprises a first port, a second port and a third port. The first port is connectable to the second port or the third port, and the second port is connected to a first mode port that is arranged to transmit and/or receive signals via the first antenna beam. The third port is connected to the first divided port.

According to another example, the second antenna aperture is divided into a first sub-aperture, a second sub-aperture, a third sub-aperture and a fourth sub-aperture. Each sub-aperture is connected to a beamforming network, either directly or via a corresponding radio unit. The beamforming network has a sum port, a first difference port and a second difference port, where the sum port is connected to the first divided port.

According to another example, the first set of antenna elements is connected to a first radio unit and the second set of antenna elements is connected to a second radio unit. The radio units are connected to a digital signal processing device which is arranged for processing signals at baseband frequencies. The digital signal processing device comprises the switching arrangement and is arranged to generate the first mode of operation and the second mode of operation.

More examples are disclosed in the dependent claims.

A number of advantages are obtained by means of the present invention. For example:

Deployment is simplified compared to prior methods.

A self-contained backhaul radio link is enabled.

The alignment method is applicable at initial set-up of links as well as during operation.

A single antenna aperture is used to generate both a wide and a narrow beam radiation pattern.

A wide beam is used for coarse alignment while a narrow beam is used for fine tuning.

BRIEF DESCRIPTION OF THE DRAWINGS

The present invention will now be described more in detail with reference to the appended drawings, where.

DETAILED DESCRIPTION

Figure 1:
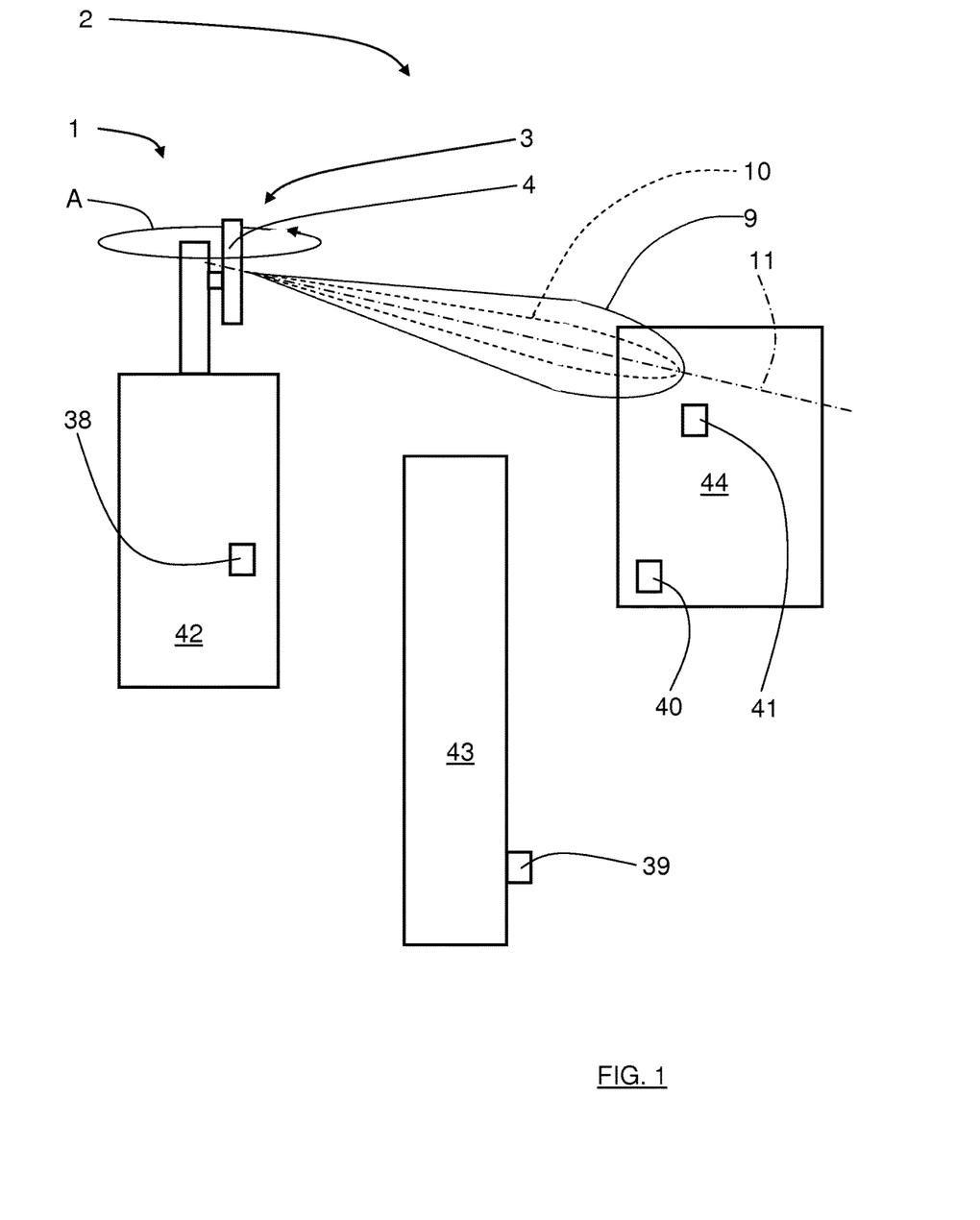
FIG. 1 shows a schematic side view of a wireless communication network.

With reference to FIG. 1, there is a first node 1 which is positioned on the top of a first building 42 and is comprised in a wireless communication network 2. In this example, the first node 1 is constituted by a backhaul aggregation point at a macro site. The wireless communication network 2 further comprises a second node 38 positioned in the first building 42, a third node 39 positioned at a second building 43, and a fourth node 40 and a fifth node 41 positioned at a third building 44, such that there is no line-of-sight between the first node 1 and any one of the other nodes 38, 39, 40, 41. In this example, the other nodes 38, 39, 40, 41 are constituted by pico base stations which are positioned closer to a ground level than the first node 1.

It is also conceivable that there are other buildings or structures positioned between the first node and one ore more of the other nodes 38, 39, 40, 41. Such buildings give rise to a blocking effect as well as further sources of diffractions and reflections, alleviating NLOS transmission between backhaul antennas at the first node 1 and at any one of the other nodes 38, 39, 40, 41.

Figure 2:
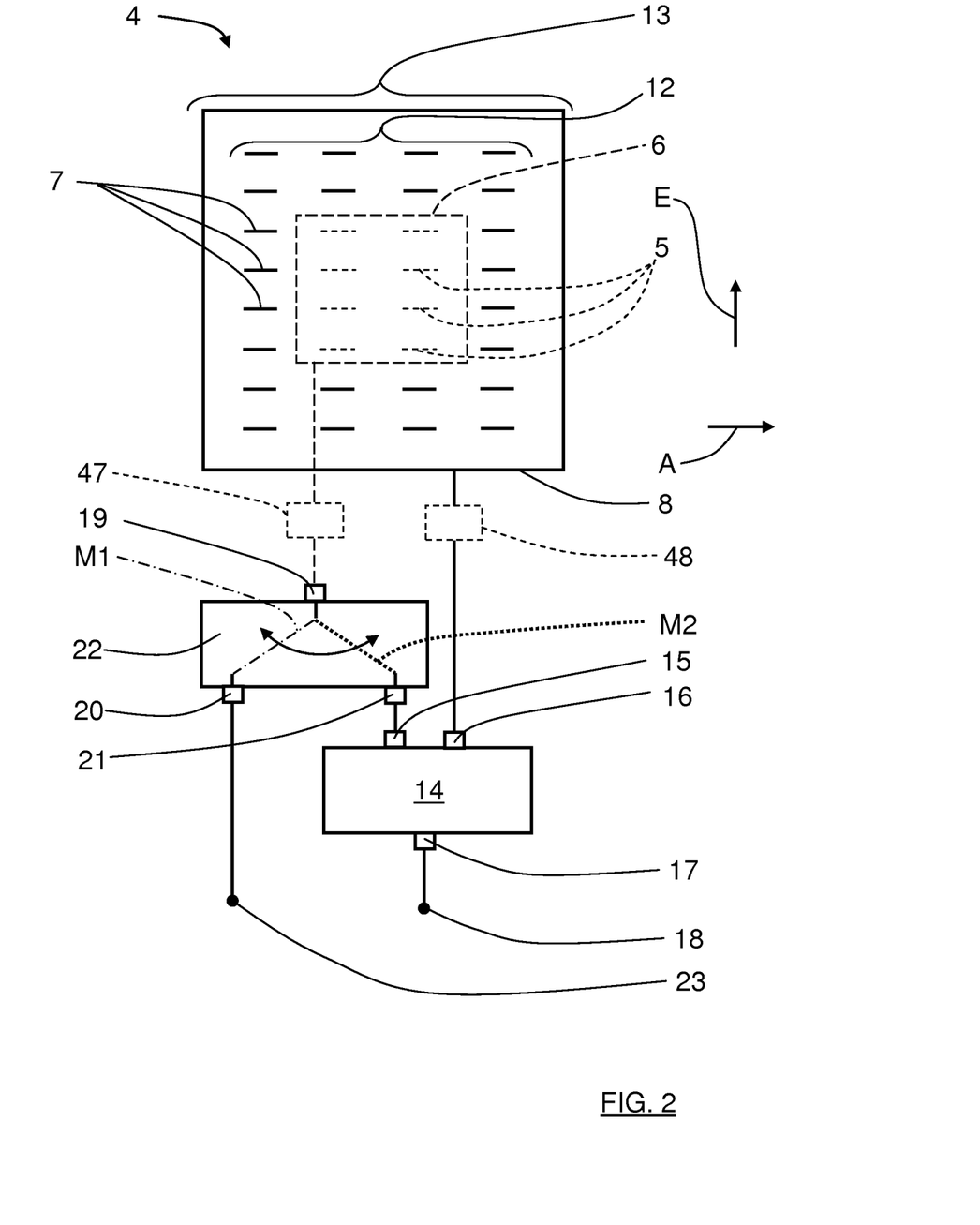
FIG. 2 shows a schematic view of an antenna arrangement according to a first example of the present invention.

With reference also to FIG. 2, the first node 1 comprises an antenna arrangement 3 which is arranged for directing antenna beams in an azimuth direction A and an elevation direction E.

Figure 3:
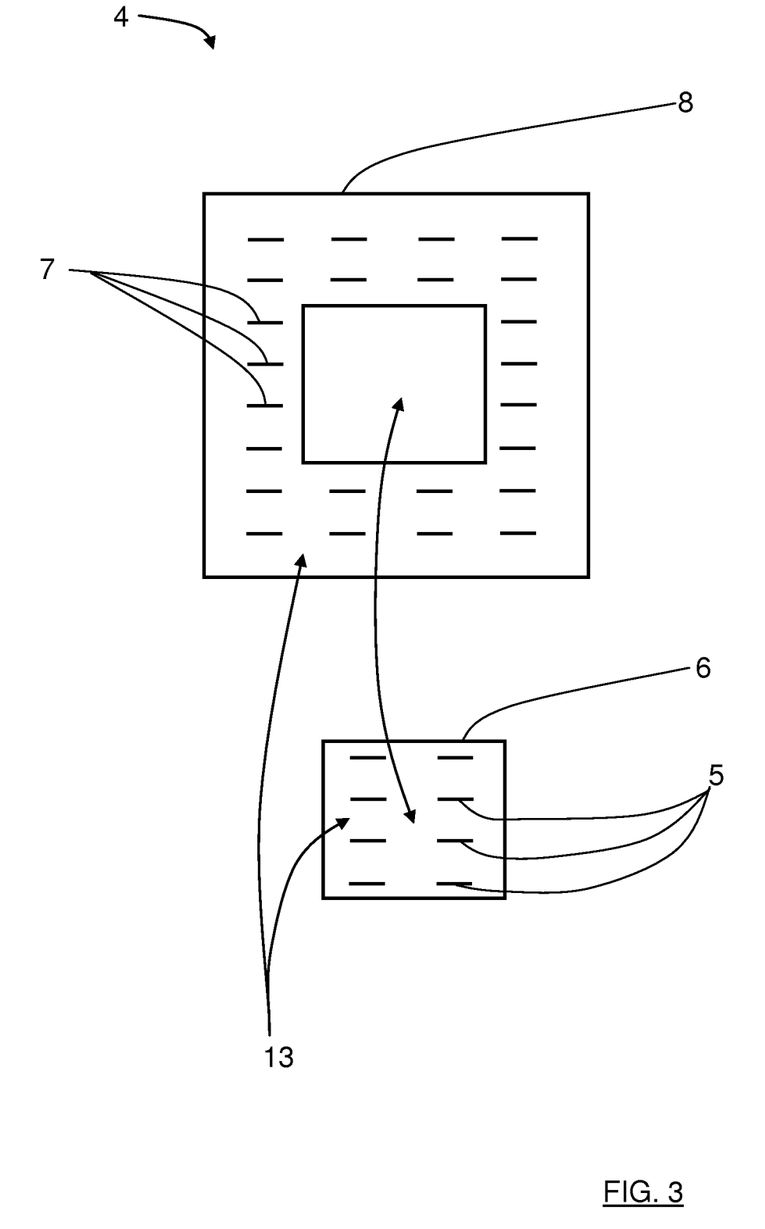
FIG. 3 shows a schematic explanatory view of an antenna according the present invention.

With reference also to FIG. 3, the antenna arrangement 3 comprises an array antenna 4, which array antenna 4 in turn comprises a first set of antenna elements 5 (only a few indicated in the Figures for the sake of clarity), forming a first antenna aperture 6, and a second set of antenna elements 7 (only a few indicated in the Figures for the sake of clarity), forming a second antenna aperture 8, where the first antenna aperture 6 is surrounded by the second antenna aperture 8.

In order to clarify the different antenna apertures 6, 8, the first antenna aperture 6 and its first set of antenna elements 5 are marked with dashed lines in FIG. 2, and in FIG. 3 the first antenna aperture 6 and its first set of antenna elements 5 is shown separated from the second antenna aperture 8 and its second set of antenna elements 7.

FIG. 3 is only shown for illustrative reasons, clearly indicating the first antenna aperture 6 and the second antenna aperture 8, these here not being neither separated, nor separable. Practically, as shown in FIG. 2, in this example the array antenna 4 comprises a total set 12 of antenna elements forming a total antenna aperture 13. The total set of antenna elements 12 is formed by the first set of antenna elements 5 and the second set of antenna elements 7, and the total antenna aperture 13 is formed by the first antenna aperture 6 and the second antenna aperture 8.

According to the present invention, the antenna arrangement 3 further comprises a switching arrangement 22 that is adapted to switch between a first mode of operation M1 and a second mode of operation M2. In the first mode of operation, the first antenna aperture 6 is arranged to generate a first antenna beam 9 having a first main pointing direction 11. In the second mode of operation, the first antenna aperture 6 and the second antenna aperture 8 are combined and arranged to generate a second antenna beam 10 having a second main pointing direction 11; in this example the first main pointing direction 11 and second main pointing direction 11 coincide. A pointing direction 11 is normally directed in an antenna normal direction at the radiation peak of the main beam The first antenna beam 9 has a wider antenna beamwidth than the second antenna beam 10 in at least one respective plane that runs parallel to, and through, the respective main pointing direction 11. The radiation pattern beam-width is controlled by the dimension of the antenna aperture. A larger dimension of the antenna aperture generates a narrower beamwidth compared to a smaller dimension of the antenna aperture. A smaller antenna aperture also provides a reduced gain at a fixed frequency.

In order to accomplish the above in a first example of the present invention, as shown in FIG. 3, the node 1 comprises a power dividing device 14 which has a first divided port 15, a second divided port 16 and a combined port 17, where power running from the combined port 17 to the divided ports 15, 16 is divided between the divided ports 15, 16, and where power running from the divided ports 15, 16 to the combined port 17 is combined from the divided ports 15, 16. The dividing ratio may be either equal or unequal.

The first divided port 15 is switchable to the first set of antenna elements 5 via the switching arrangement 22, and the second divided port 16 is arranged to transmit and/or receive signals via the second set of antenna elements 7. The combined port 17 is connected to a second mode port 18 that is arranged to transmit and/or receive signals via the second antenna beam 10.

The switching arrangement 22 comprises a first port 19, a second port 20 and a third port 21, where the first port 19 is connectable to the second port 20 or the third port 21. In the first mode of operation M1, the first port 19 is connected to the second port 20, as indicated with dash-dotted lines. In the second mode of operation M2, the first port 19 is connected to the third port 21, as indicated with dotted lines.

The second port 20 is connected to a first mode port 23 that is arranged to transmit and/or receive signals via the first antenna beam 9, and the third port 21 is connected to the first divided port 15.

This means that in the first mode of operation M1, the switching arrangement 22 connects the first antenna aperture to the first mode port 23, such that the first mode port 23 in the first mode of operation M1 is arranged to transmit and/or receive signals via the first antenna beam 9.

Furthermore, in the second mode of operation M2, the switching arrangement 22 connects the first antenna aperture 6 and the second antenna aperture 8 in combination and in phase to the second mode port 18, such that the second mode port 18 in the second mode of operation M2 is arranged to transmit and/or receive signals via the second antenna beam 10.

The first mode of operation M1 comprises a first alignment procedure, and the second mode of operation M2 comprises a second alignment procedure, where the first alignment procedure is coarser than the second alignment procedure since the first antenna beam 9 has a wider antenna beamwidth than the second antenna beam 10 as mentioned above.

In this way, an alignment may be performed in two steps. First by a relatively coarse alignment procedure, the first alignment procedure in the first mode of operation M1, where a coarse adjustment is performed, ensuring that the nodes in question are aligned to a certain degree. Secondly by a relatively accurate alignment procedure, the second alignment procedure in the second mode of operation M2, where an accurate adjustment is performed by means of fine tuning. The nodes in question are then suitably aligned with each other.

The beamwidth is normally measured as a half-power beamwidth, HPBW, where this measure is the angular span within which the beam power lies within half the power of the beam peak power. This measure may be taken in any cut running along the pointing direction, normally in an azimuth cut and an elevation cut.

The present invention thus aims to implement an array antenna that can generate a wide beam and a narrow beam and switch between these two for coarse and fine alignment tuning, respectively The whole antenna aperture is excited to form the narrow beam while a smaller portion is used to form a wide beam radiation pattern. In order to further improve the pointing accuracy, a difference radiation pattern is implemented as will be described below as a second example with reference to FIG. 4.

Figure 4:
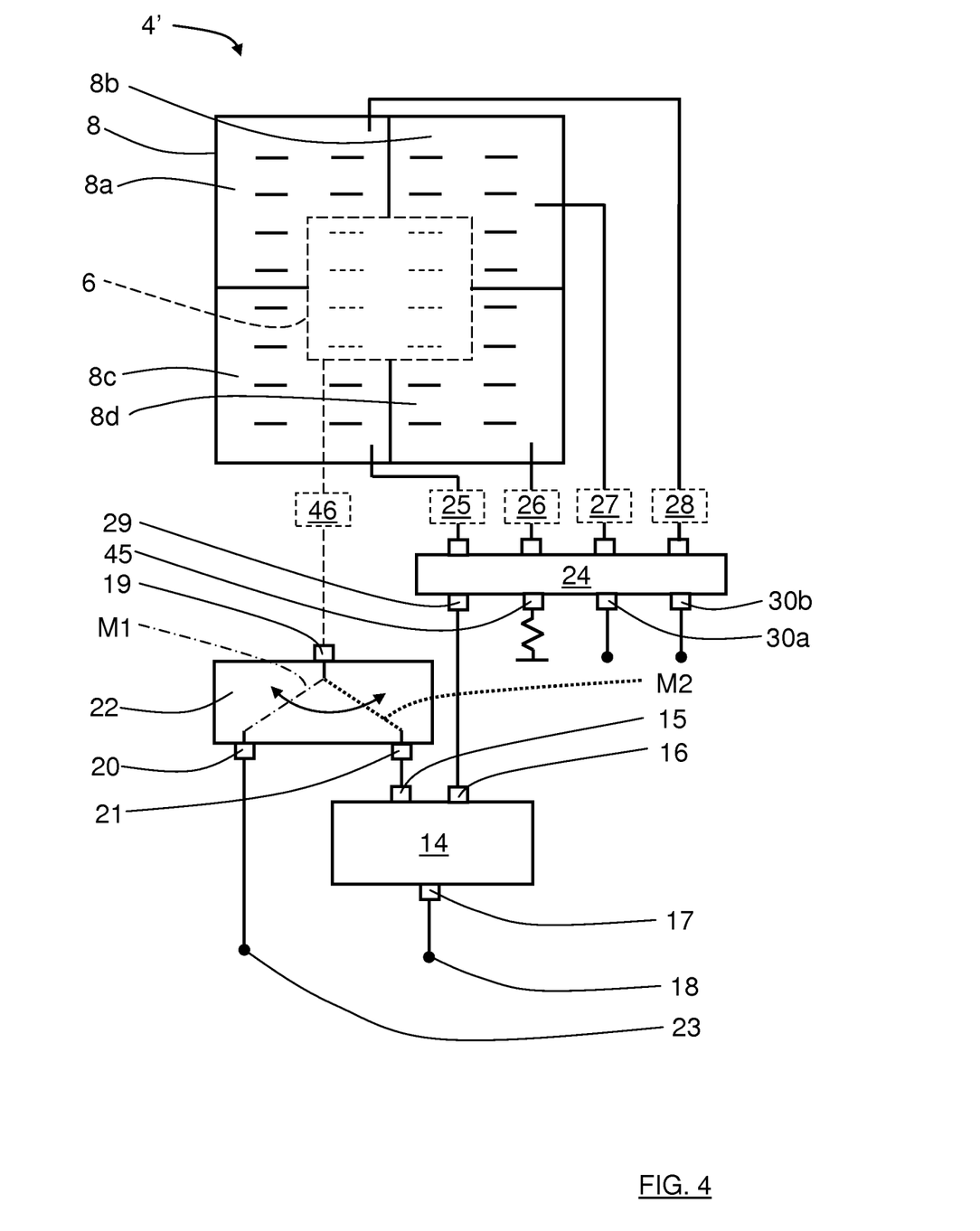
FIG. 4 shows a schematic view of an antenna arrangement according to a second example of the present invention.

According to the second example, the second antenna aperture 8 is divided into a first sub-aperture 8a, a second sub-aperture 8b, a third sub-aperture 8c and a fourth sub-aperture 8d. Each sub-aperture 8a, 8b, 8c, 8d is connected to a beamforming network 24, where the beamforming network 24 comprises a sum port 29, a first difference port 30a, a second difference port 30b and a terminated port 45, where the sum port 29 is connected to the first divided port 16.

That means that the functionality of the first example is maintained via the sum port 29 that connects the second antenna aperture 8 to the first divided port 16, and where the first antenna aperture is connected to the port 19 of the switching arrangement 22 as in the first example.

As an addition to the first example, here the difference ports 30a, 30b generate difference radiation pattern in one plane, azimuth or elevation, or in two orthogonal planes, azimuth and elevation, where each difference radiation pattern has a null in the antenna normal direction at the radiation peak of the main beam. i.e. in the antenna pointing direction 11. By means of such difference radiation patterns, an enhanced accuracy may be acquired.

Each sub-aperture 8a, 8b, 8c, 8d is connected to the beamforming network 24, either directly or, as shown in FIG. 4 with dashed lines, via a corresponding radio unit 25, 26, 27, 28. There may also be a radio unit 46 between the first antenna aperture 6 and the first port 19 of the switching arrangement 22.

The radio units, indicated with dashed lines since they are optional, may be in the form of so-called transmit and receive modules (TRM). These may be incorporated in the distribution network. Furthermore, phase shifters may be included in the TRM:s for in phase adjustment and/or for limited scan of the corresponding beam.

Figure 5:
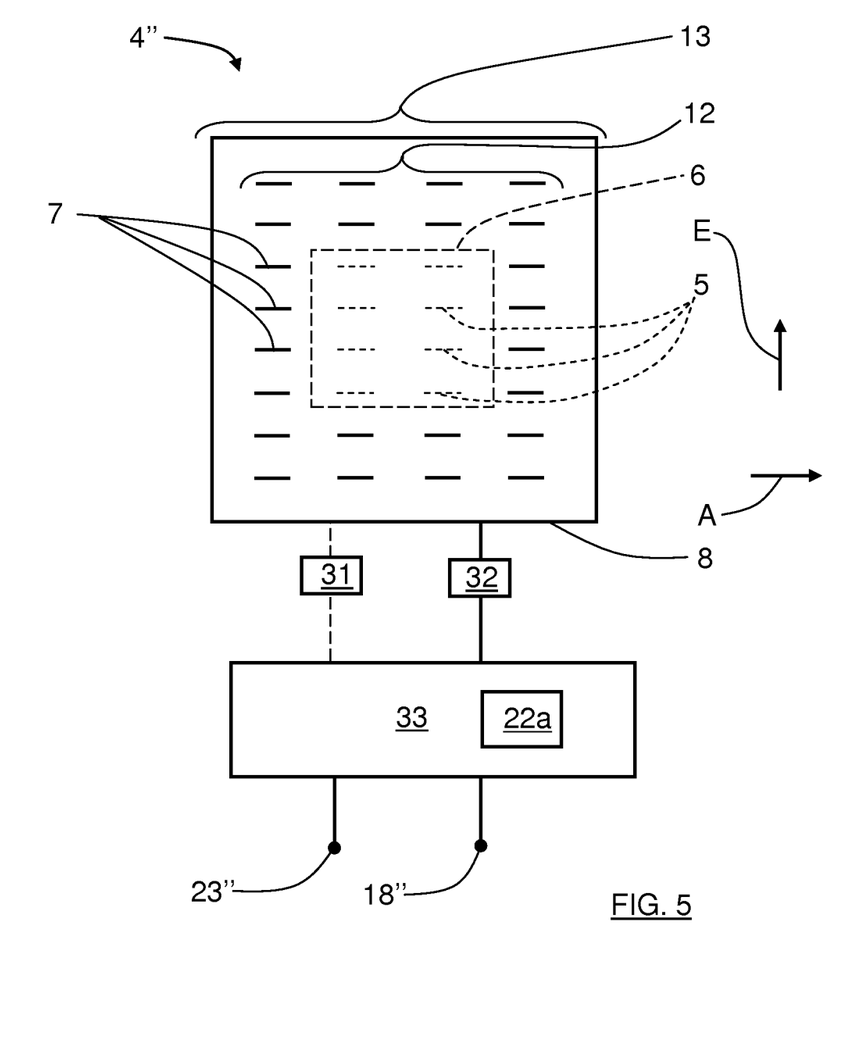
FIG. 5 shows a schematic view of an antenna arrangement according to a third example of the present invention.

According to a third example, with reference to FIG. 5, there is an array antenna 4" where the first set of antenna elements 5 is connected to a first radio unit 31 and the second set of antenna elements 7 is connected to a second radio unit 32. The radio units 31, 32 are connected to a digital signal processing device 33 that is arranged for processing signals at baseband frequencies and comprises a switching arrangement 22a. By means of this switching arrangement, the signal processing device 33 is arranged to generate the first mode of operation M1 and the second mode of operation M2.

In the first mode of operation M1, the switching arrangement 22a connects the first antenna aperture 6 to the first mode port 23", such that a first mode port 23" in the first mode of operation M1 is arranged to transmit and/or receive baseband signals via the first antenna beam 9.

Furthermore, in the second mode of operation M2, the switching arrangement 22a connects the first antenna aperture 6 and the second antenna aperture 8 in combination and in phase to a second mode port 18", such that the second mode port 18" in the second mode of operation M2 is arranged to transmit and/or receive baseband signals via the second antenna beam 10.

Figure 6:
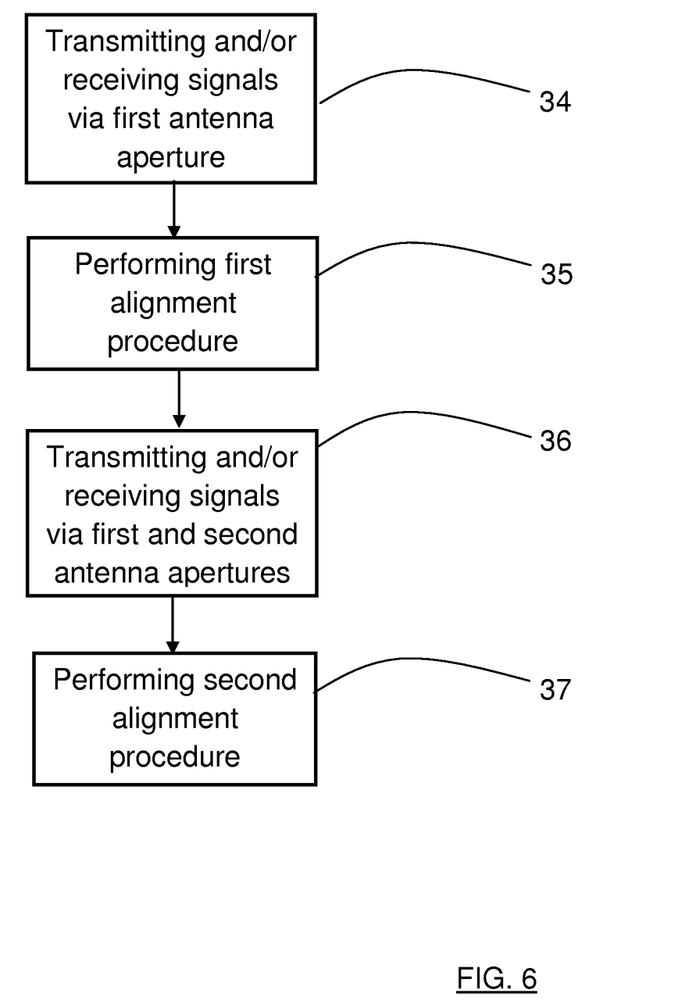
FIG. 6 shows a flow chart of a method according to the present invention.

With reference to FIG. 6, the present invention also relates to a method for alignment of a first node 1 with a second node 38, 39, 40, 41 in a wireless communication network 2, which method for example may be applied during backhaul installation and/or during operation.

For a first mode of operation M1, the method comprises the steps:

34: enabling a first mode port 23 to transmit and/or receive signals via a first antenna aperture 6, using a first antenna beam 9 having a first main pointing direction 11; and 35: performing a first alignment procedure.

For a second mode of operation M2, the method further comprises the steps:

36: enabling a second mode port 18 to transmit and/or receive signals via the first antenna aperture 6 and a second antenna aperture 8 in combination, using a second antenna beam 10 having a second main pointing direction 11; and 37: performing a second alignment procedure.

The first antenna beam 9 has a wider antenna beamwidth than the second antenna beam 10 in at least one respective plane that runs parallel to, and through, the respective main pointing direction 11

An alignment procedure according to the above may be performed in many suitable ways and is in itself previously known. For example, the array antenna may be tilted in different direction, against another node which is transmitting a signal. By measuring the signal strength of the received signal, it may be determined which certain tilt direction that provides a signal strength peak.

During the first alignment procedure, in the first mode of operation M1, the antenna array 4 generates a relatively wide first antenna beam 9, which enables a relatively coarse alignment. During the second alignment procedure, in the second mode of operation M2, the antenna array 4 generates a relatively narrow second antenna beam 10, which enables a relatively accurate alignment. When the second alignment procedure has been satisfactory executed, the antenna array is considered to be aligned with the other node to a sufficient degree of accuracy.

The present invention is not limited to the above, but may vary within the scope of the appended claims. For example, which node that is transmitting and which node that is receiving during the alignment may be switched to any suitable configuration.

Other embodiments of the antenna apertures such as circular, elliptical or rectangular antenna apertures may be envisioned. Generally, the antenna apertures may have any shape, one does not have to surround the other, and they do not have to be adjacent. Instead, the antenna apertures may be positioned separated from each other by a certain distance. The antenna apertures may have different antenna beam pointing directions as well.

The first antenna aperture 6 and the second antenna aperture 8 may each have an azimuth extension A and an elevation extension E, which extensions A, E may coincide.

When terms like orthogonal and the like are used, these terms are not to be interpreted as mathematically exact, but within what is practically obtainable.

The first node 1 is in the example constituted by a backhaul aggregation point at a macro site. The first node may be any sort of node, where the present invention generally refers to antenna alignment between any two nodes. The present invention does not require non line-of-sight for all antenna beams, but also works for antenna beams in the wireless communication network 3 where line-of-sight exists.

The other nodes 38, 39, 40, 10 may be any sort of node, but may mainly be constituted by a smaller type of base station such as a so-called pico base station or similar. There may be any number of second nodes, and the method may be performed for each of these as desired.

The present invention is not limited to alignment in any certain plane, such as an azimuth plane A, an elevation plane E or in both azimuth and elevation planes; any plane or combination of planes is conceivable, where each respective plane runs parallel to, and through, the respective main pointing direction 11.

The first antenna aperture 6 may be smaller than the second antenna aperture 8, but that is not necessary. The combination of the first antenna aperture 6 and the second antenna aperture 8 is always larger than the first antenna aperture 6, which is essential for the present invention.

As indicated with dashed lines in FIG. 2, there may be radio units 47, 48, such as for example TRM:s, connected between the antenna apertures 6, 8 and the first port 19 of the switching arrangement 22 and the second divided port 16, correspondingly.

The first set of antenna elements 5 and the second set of antenna elements 7 may be linearly polarized or dual polarized. The different sets of antenna elements do not have to have the same polarization.

In the examples described, there has been a first node 1, constituted by a backhaul aggregation point at a macro site, which first node comprises an antenna arrangement 3 which in turn comprises an array antenna 4. However, generally, the antenna arrangement 3 may be comprised in any node in the wireless communication network 2, and in one or several nodes in the wireless communication network 2. This means that the present invention for example may relate to a node at a pico base station, or similar.

The invention claimed is:

1. A node in a wireless communication network, the node comprising:
   an antenna arrangement comprising:
      an array antenna comprising: (i) a first set of antenna elements forming a first antenna aperture, and (ii) a second set of antenna elements forming a second antenna aperture, and
      a switching arrangement that is adapted to switch between a first mode of operation and a second mode of operation; and
   a power dividing device comprising a first divided port, a second divided tort, and a combined port,
   wherein the first antenna aperture is arranged to generate a first antenna beam having a first main pointing direction in the first mode of operation,
   wherein the first antenna aperture and the second antenna aperture are combined and arranged to generate a second antenna beam having a second main pointing direction in the second mode of operation, the first antenna beam having a wider antenna beamwidth than the second antenna beam in at least one respective plane that runs parallel to, and through, the respective main pointing direction,
   wherein the second antenna aperture is divided into a first sub-aperture, a second sub-aperture, a third sub-aperture and a fourth sub-aperture, each sub-aperture connected to a beamforming network,
   wherein the beam forming network comprises a sum port, a first difference port, and a second difference port, the difference ports configured to generate difference radiation patterns in one or more of an azimuth plane and an elevation plane, wherein each of the difference radiation patterns has a null in the respective main pointing direction, and wherein the first divided port is connected to the switching arrangement, the second divided port is connected to the sum port of the beam forming network, and the combined port s connected to a second mode port that is arranged to transmit and/or receive signals via the second antenna beam.

2. The node according to claim 1, wherein the second antenna aperture is larger than the first antenna aperture, where the antenna apertures at least partly are adjacent.

3. The node according to claim 1, wherein the first main pointing direction and the second main pointing direction coincide.

4. The node according to claim 1, wherein the first mode of operation comprises a first alignment procedure and the second mode of operation comprises a second alignment procedure, the first alignment procedure being coarser than the second alignment procedure.

5. The node according to claim 1, wherein the array antenna comprises a total set of antenna elements forming a total antenna aperture, the total set of antenna elements being formed by the first set of antenna elements and the second set of antenna elements, and the total antenna aperture being formed by the first antenna aperture and the second antenna aperture.

6. The node according to claim 1, wherein power running from the combined port to the divided ports is divided between the divided ports, and where power running from the divided ports to the combined port is combined from the divided ports, where the first divided port is switchable to the first set of antenna elements via at least the switching arrangement, and where the second divided port is arranged to transmit and/or receive signals via the second set of antenna elements.

7. The node according to claim 6, wherein the switching arrangement comprises a first port, a second port and a third port, where the first port is connectable to the second port or the third port, the second port being connected to a first mode port that is arranged to transmit and/or receive signals via the first antenna beam, and the third port being connected to the first divided port.

8. The node according to claim 6, wherein the first sub-aperture, the second sub-aperture, the third sub-aperture and the fourth sub-aperture are connected to the beamforming network either directly or via a corresponding radio unit, and wherein the sum port is connected to the first divided port.

9. The node according to claim 1, wherein the first set of antenna elements is connected to a first radio unit and the second set of antenna elements is connected to a second radio unit, the radio units being connected to a digital signal processing device, where the digital signal processing device is arranged for processing signals at baseband frequencies, the digital signal processing device comprising the switching arrangement and being arranged to generate the first mode of operation and the second mode of operation.

10. The node according to claim 1, wherein the first antenna aperture is surrounded by the second antenna aperture.

11. The node according to claim 1, wherein the first antenna aperture and the second antenna aperture each have an azimuth extension and an elevation extension, which respective extensions coincide.

12. The node according to claim 1, wherein the first set of antenna elements and the second set of antenna elements are dual polarized.

13. A method for alignment of a first node with a second node in a wireless communication network, the method comprising:
a first mode of operation comprising the steps of:
enabling a first mode port to transmit and/or receive signals via a first antenna aperture, using a first antenna beam having a first main pointing direction, and
performing a first alignment procedure;
a second mode of operation comprising the steps of:
enabling a second mode port to transmit and/or receive signals via the first antenna aperture and a second antenna aperture in combination, using a second antenna beam having a second main pointing direction, the first antenna beam having a wider antenna beamwidth than the second antenna beam in at least one respective plane that runs parallel to, and through, the respective main pointing direction, and
performing a second alignment procedure; and
generating difference radiation patterns in one or more of an azimuth plane and an elevation plane, wherein each of the difference radiation patterns has a null in the respective main pointing direction,
wherein a switching arrangement is adapted to switch between the first mode of operation and the second mode of operation,
wherein the second antenna aperture is connected to a beamforming network comprising a sum port, a first difference port, and a second difference port,
wherein the difference ports are configured to generate the difference radiation patterns and the sum port is connected to a second divided port of a power dividing device, and device,
wherein the power dividing device comprises a first divided port, the second divided port, and a combined port connected to the second mode port that is arranged to transmit and/or receive signals via the second antenna beam, and
wherein the first divided port is connected to the switching arrangement, and the second divided port is connected to the sum port of the beam forming network.

14. The method according to claim 13, wherein the first alignment procedure is coarser than the second alignment procedure.

15. The method according to claim 13, wherein the first main pointing direction and the second main pointing direction coincide.

* * * * *